Jan. 11, 1938. W. C. SHAW 2,104,776
DIAPHRAGM AND METHOD OF MAKING SAME
Filed April 23, 1934 5 Sheets-Sheet 1

INVENTOR:
WILLIAM CLIFFORD SHAW
BY
Cox & Moore ATTYS.

Jan. 11, 1938.  W. C. SHAW  2,104,776
DIAPHRAGM AND METHOD OF MAKING SAME
Filed April 23, 1934   5 Sheets-Sheet 2
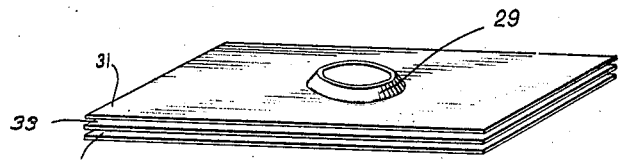
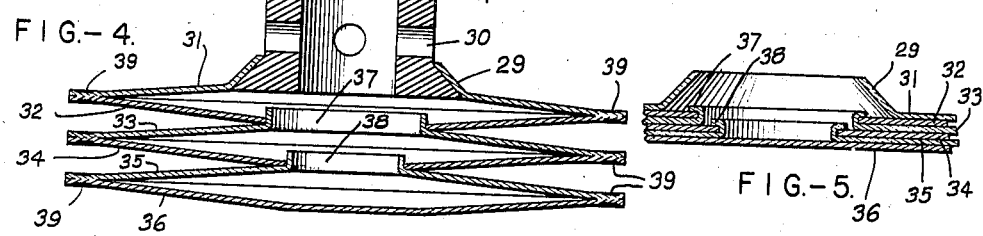
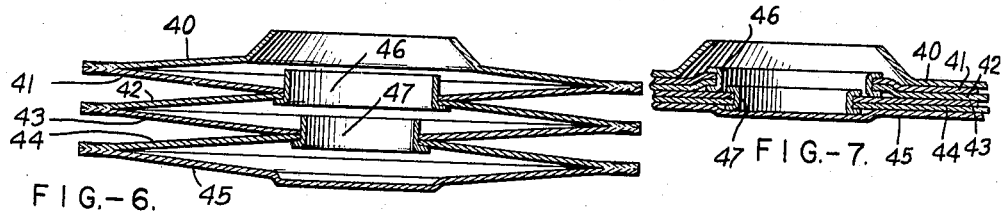
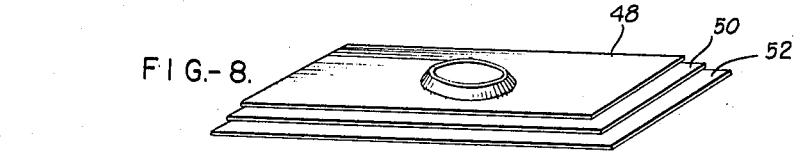
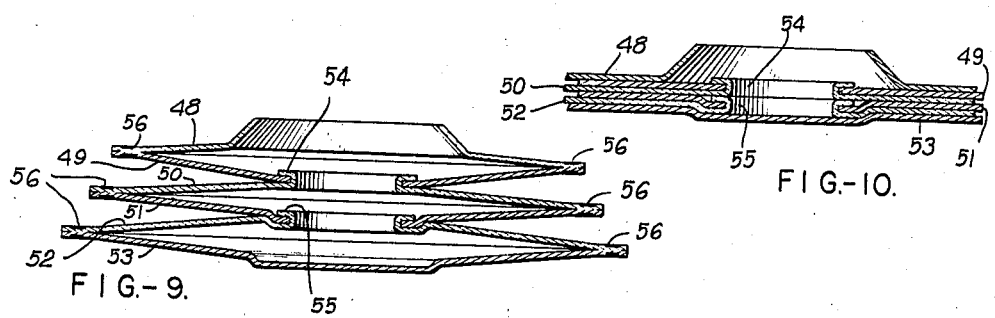
INVENTOR:
WILLIAM CLIFFORD SHAW
BY
Cox & Moore ATT'YS.

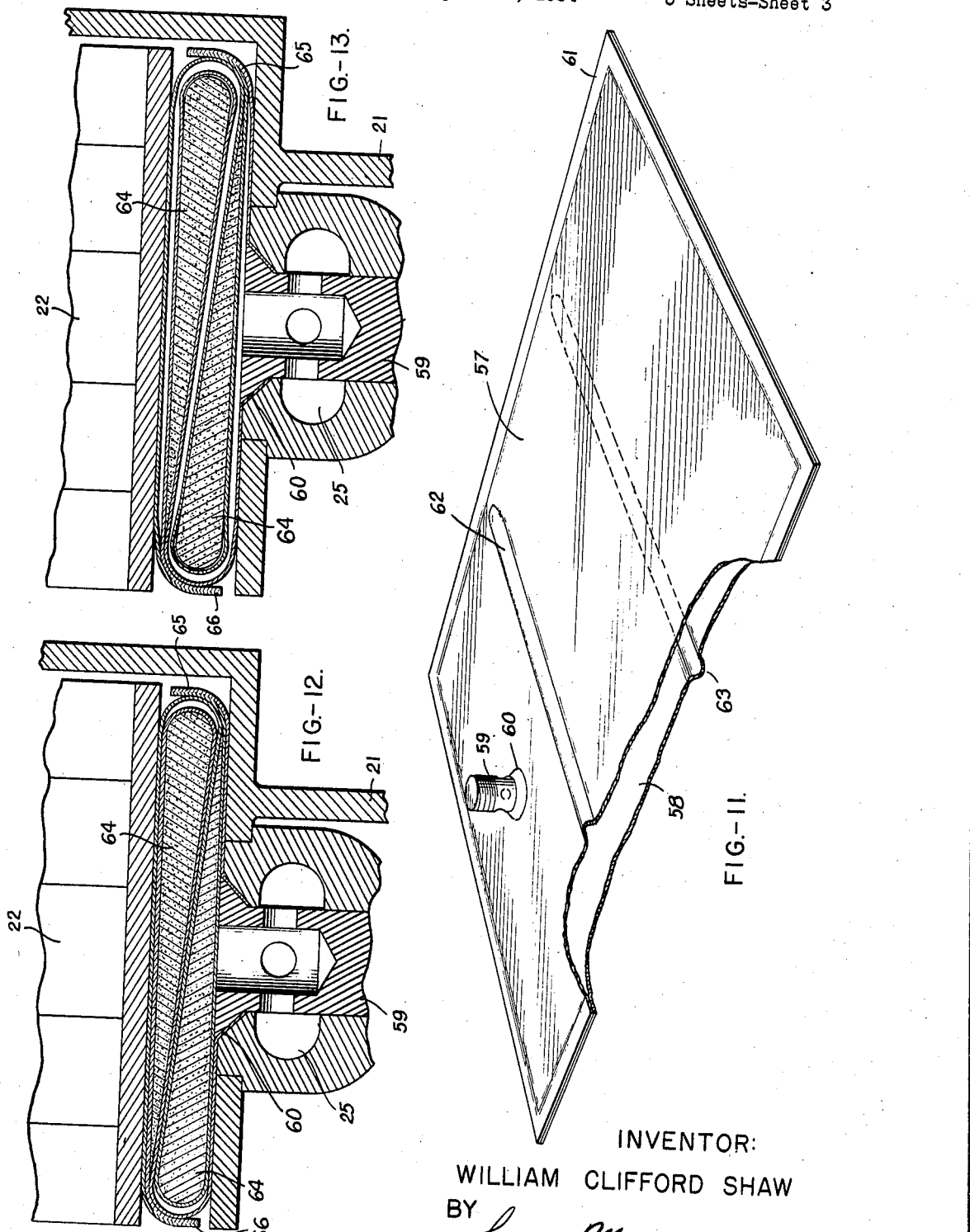

Jan. 11, 1938.  W. C. SHAW  2,104,776
DIAPHRAGM AND METHOD OF MAKING SAME
Filed April 23, 1934   5 Sheets-Sheet 5
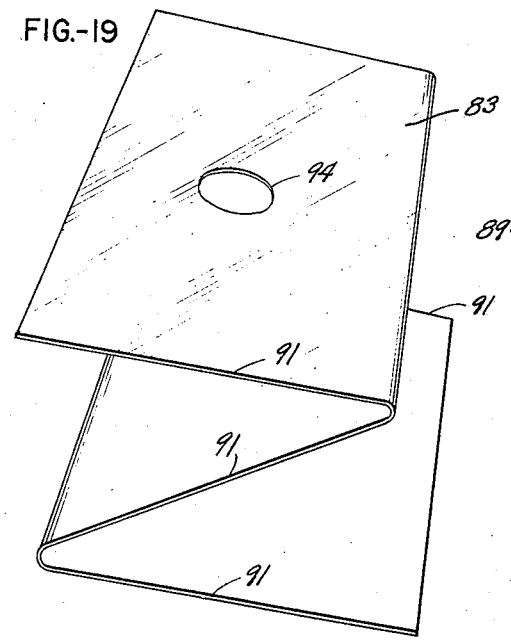
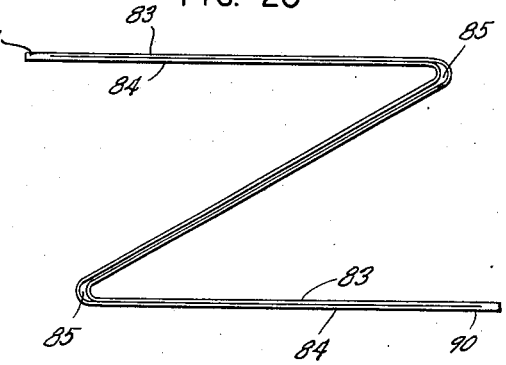
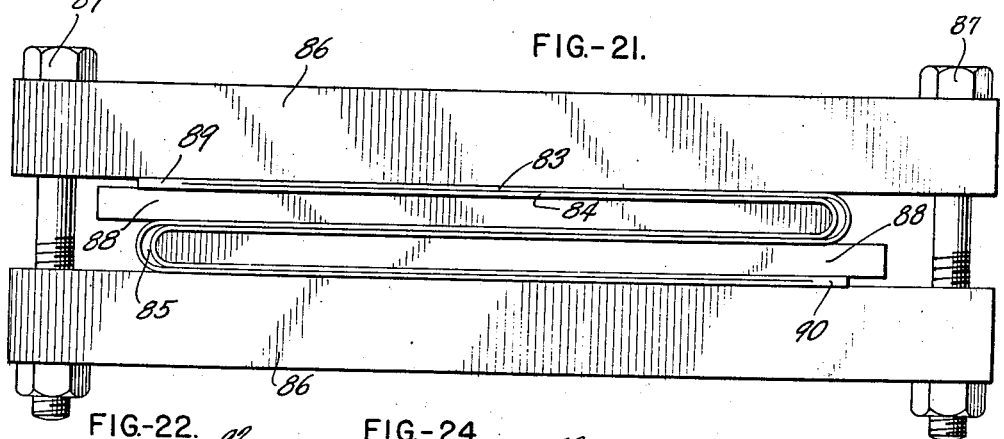
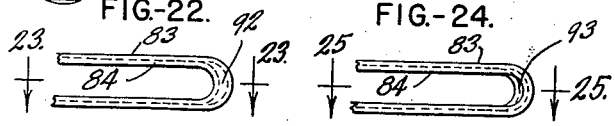
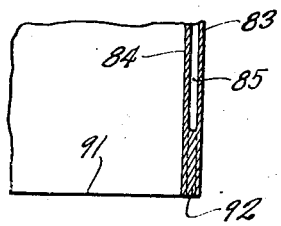
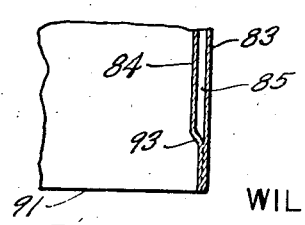
FIG.-23.    FIG. 25.
INVENTOR:
WILLIAM CLIFFORD SHAW
BY
Cox & Moore ATT'YS.

Patented Jan. 11, 1938

2,104,776

UNITED STATES PATENT OFFICE 2,104,776

DIAPHRAGM AND METHOD OF MAKING SAME

William Clifford Shaw, Woodstock, Ontario, Canada, assignor, by mesne assignments, to Linderman Devices, Incorporated, Wilmington, Del., a corporation of Delaware Application April 23, 1934, Serial No. 721,844

17 Claims. (Cl. 29—152.1)

This invention relates to fluid pressure and vacuum operated metallic diaphragms and provides instrumentalities adaptable for general application and transmission of power which are durable, highly efficient in operation, inexpensive to manufacture and assemble, and which are capable of utilization in connection with various types of devices.

This application is a continuation in part of my copending applications Serial Nos. 654,279 and 683,585, filed January 30, 1933 and August 4, 1933, respectively.

One of the objects of my present invention is to provide an all metallic diaphragmatic device for use in connection with various types of fluid pressure and vacuum operating systems.

Another object of my invention resides in providing a specific adaptation of my improved diaphragmatic device wherein the same is arranged in combination with outer instrumentalities to provide a fluid pressure operated power transmitting member, herein particularly illustrated as a braking device and specifically as a braking device for automotive apparatus which is self-sealing, durable, all metallic, automatically compensating for wear in a simple manner, and which eliminates inherent defects in existing devices of this general nature.

Another object of this invention resides in providing expansible fluid metal chambers or diaphragms for moving the brake shoes against the surface to which the brakes are applied, and for convenience in description, applicant will use the ordinary brake drum of an automobile as an illustrative example.

Another object of this invention resides in the provision of a wheel construction which enables one to use flat metal diaphragms and which provides for ample circulation of the fluid which is used to apply the pressure to the brakes as well as prevent leakage of the fluid.

Another object of this invention resides in the novel construction of the diaphragm or expansible metal chamber which is used for urging the brake shoes against the brake drum. The diaphragm is preferably in the form of a bellows with any desired number of sections superimposed the one upon the other and so connected to each other that a permanent fluid-tight chamber is formed which should not require replacement or repair during the normal life of the car with which it is used. This expansible chamber, however, is so mounted as to be readily replaceable in case it should become damaged through accident.

Another object of this invention relates to a method of making expansible diaphragms in which a plurality of metallic plates or leaves, preferably of spring metal, are superimposed one upon the other and joined at their peripheral edges to form an expansible chamber; and in connecting groups of such chambers substantially centrally thereof to form a fluid-tight communicating passage between the diaphragms.

Another object of this invention is to produce a new article of manufacture having a plurality of expansible chambers arranged in series to form a unitary accordion-like expansible chamber for the purpose of urging brake shoes into engagement with brake drums as in the present invention, or for any purpose to which such an expansible diaphragm may be used.

Another object of this invention is to provide a method whereby expansible diaphragms can be made up from a plurality of flat superimposed plates or leaves connected peripherally and joined together centrally by fluid-tight passages, these overlapping passages being formed either by openings in adjacent leaves having their edges permanently secured together either by welding or by having a flange on one of the openings overlapping the edge of the other opening or by having an eyelet or the like inserted through both openings and upset over the edges of both openings. In upsetting the eyelets or in upsetting the flange referred to, I preferably use a single upsetting tool which simultaneously upsets all of the flanges after a plurality of sections have been superimposed one upon the other. In carrying out this part of the invention, I have found that a single upsetting operation can be very efficiently performed by making successive openings gradually larger from one end of the series of expansible sections to the other, the size of the openings increasing toward that side from which the upsetting tool is inserted as will be more fully brought out hereinafter.

Another object of this invention is to provide a method of applying braking pressure to the brake shoes of an automobile or the like or to any other form of brake by means of an expansible metallic chamber preferably formed of a series of flat plates or leaves connected together to form an accordion-like chamber.

Another object of this invention is to provide a diaphragm of the type described which is made of a series of leaves preferably welded or otherwise permanently secured at their edges in which the connecting portions of the leaves are so arranged as to not be subjected to fatigue due to constant expansion and contraction of the diaphragm.

Another object of this invention is to provide a diaphragm construction in which a pair of flat leaves are sealed peripherally and then folded upon themselves to form a multiple layer diaphragm construction which is equivalent to a series of superimposed single diaphragms.

Another object of this invention is to secure a pair of flat leaves together peripherally and then to bend opposite edge portions thereof against the central portion in overlapping relation therewith to form an expansible diaphragm which has greater expanding powers than the single diaphragm, and in so arranging the edges of the leaves which are joined as to prevent the same from being subjected materially to any of the flexing action of the leaves during the repeated expansion and contraction of the diaphragm.

Another object of this invention is to provide a diaphragm construction by superimposing flat leaves, sealing them alternately along their opposed edges, interfitting them with a second set of similarly arranged leaves, and then sealing the sets to form a multiple diaphragm construction.

Another object of this invention is to provide a diaphragm construction by folding a pair of leaves upon themselves, either together or individually, and thereafter sealing them to form a multiple layer diaphragm construction.

Another object of this invention is to provide a diaphragm construction which may be readily and cheaply made as above defined and which will be compact and yet which will have large capacity in proportion to the material used and space occupied; and to provide a construction which is wholly durable and satisfactory in operation.

Other objects of this invention will appear hereinafter as the description thereof proceeds, the novel features, arrangements, and combinations being clearly set forth in the specification and claims hereunto appended.

In the drawings:

Fig. 3 is a perspective view of a diaphragm constructed according to my invention;

Fig. 4 is a longitudinal section through the diaphragm shown in Fig. 3 showing the diaphragm in a partially completed state;

Fig. 5 is a view similar to Fig. 4 showing the finished diaphragm;

Figs. 6 and 7 are views similar to Figs. 4 and 5 showing a modified form of my invention;

Fig. 8 is a view similar to Fig. 3 showing a still further modification of the diaphragm construction;

Fig. 9 is a longitudinal sectional view through the diaphragm shown in Fig. 8 showing the diaphragm in a partially completed state;

Fig. 10 is a view similar to Fig. 9 showing the diaphragm completed;

Fig. 11 is a perspective view of a still further modification of my invention in a partially completed state;

Figure 2:
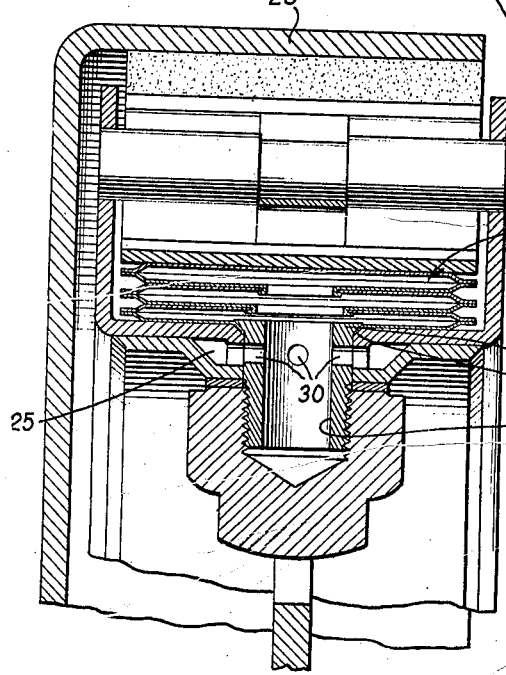
Fig. 2 is a section taken along the line 2—2 of Fig. 1.

Fig. 12 indicates the completed diaphragm shown in Fig. 11 as applied to a brake similar to what is shown in Fig. 2 with the diaphragm collapsed; and Fig. 13 is a view similar to Fig. 12 with the diaphragm expanded.

Figure 14:
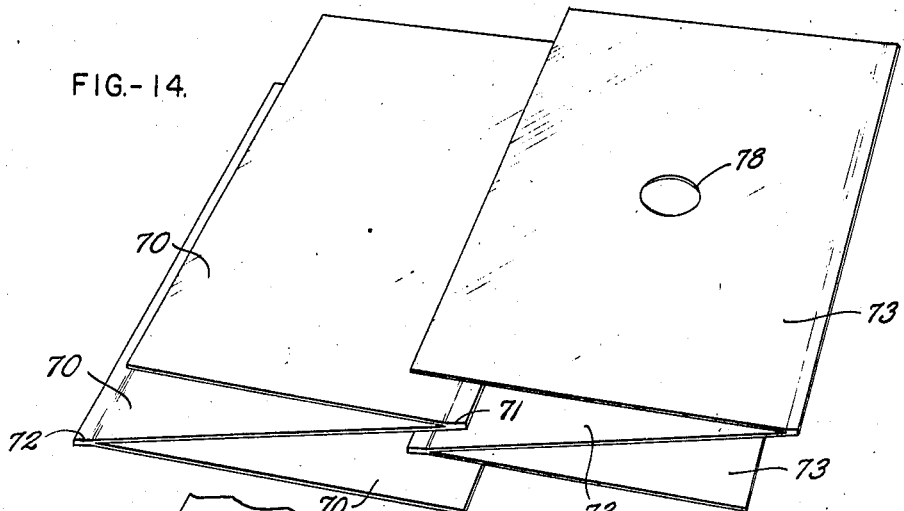

Fig. 14 is a perspective view of a still further modification of my invention in partially formed condition, showing two sets of superimposed and alternately connected sheets in position to be interfitted.

Figure 15:
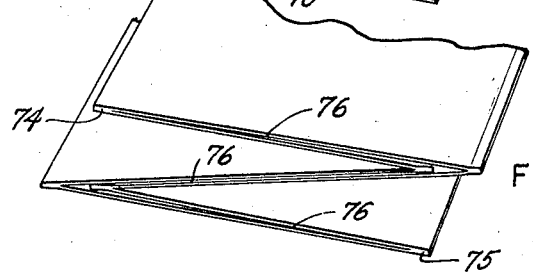

Fig. 15 is a similar perspective view showing the parts of Fig. 14 after they have been interfitted and partially secured together as by welding.

Figure 16:
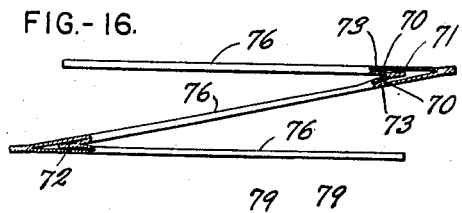

Fig. 16 is an end view of the Fig. 14 embodiment construction after complete sealing as by welding but with certain parts broken away to show better the construction.

Figure 17:
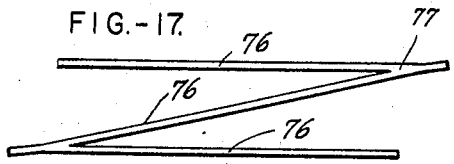
Figure 18:
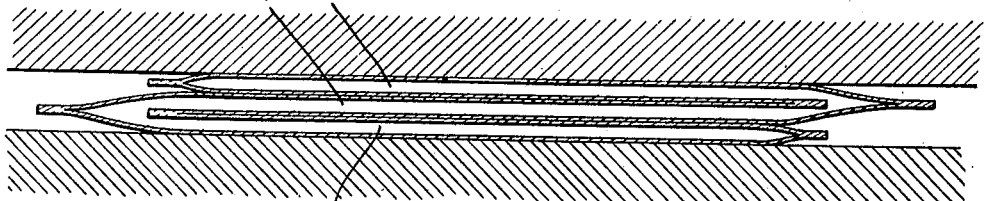

Fig. 17 is an end view of the construction as in Fig. 16, but without parts being broken away, and Fig. 18 is a sectional view through this embodiment of my diaphragm showing the diaphragm plates expanded as in use in the completed construction.

Fig. 19 is a perspective view showing one plate or diaphragm part of a still further modification of my invention.

Fig. 20 is an end view showing two plates as in Fig. 19 interfitted and partially secured as by welding to form a partially completed diaphragm.

Fig. 21 is an end view showing more particularly the means for bending the plates into the position they have in the completed diaphragm.

Figs. 22 and 23 are details showing one method for securing the ends of the sheets in this embodiment of the diaphragm, Fig. 23 being taken along the line 23—23 of Fig. 22, and Figs. 24 and 25 are details showing an alternate method of securing the ends of the sheets together, Fig. 25 being taken along the line 25—25 of Fig. 24.

Figure 1:
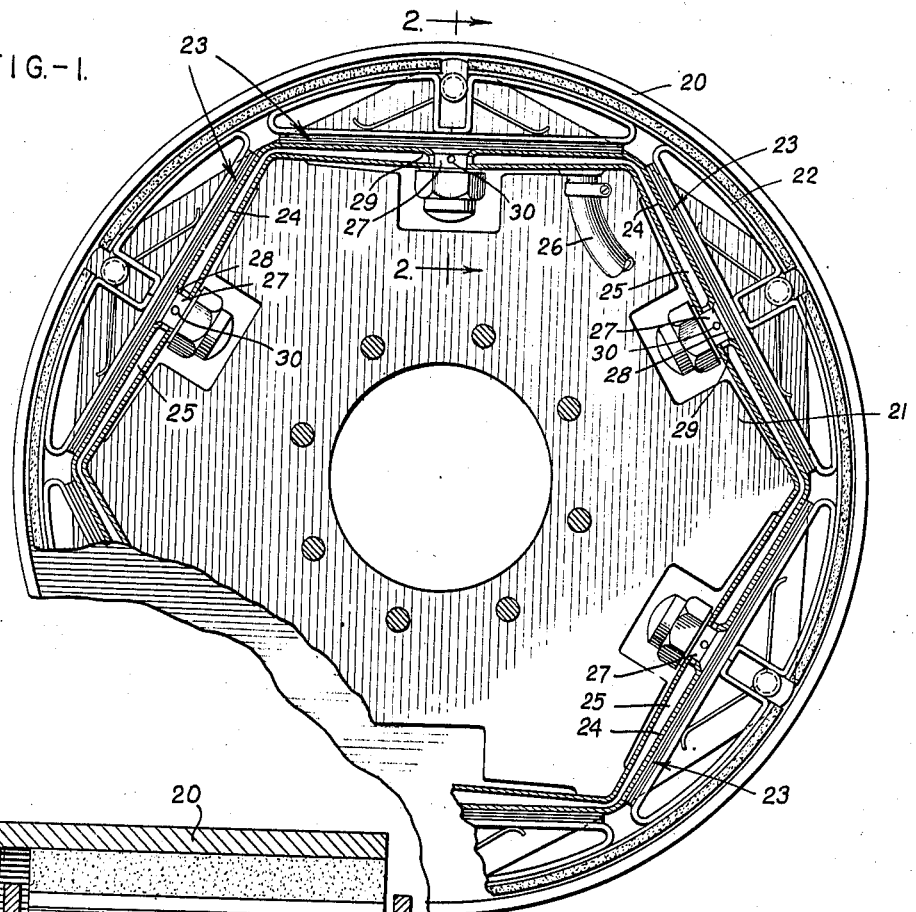
Fig. 1 is an inside elevational view of the braking mechanism with a diaphragm constructed according to my invention used for applying the braking pressure, parts of the braking mechanism being broken away.

In Figs. 1 and 2 of the drawings, 20 indicates the brake drum of an automobile or the like, and 21 a brake shoe support which is generally secured to the axle of an automobile. The brake shoes are indicated by the reference numeral 22 and these are arranged peripherally about the support 21 with diaphragms 23 arranged between the brake shoes and the adjacent surface 24 of a peripheral metallic chamber 25 on the support 21 which chamber 25 is adapted to receive the pressure fluid through a tube 26 in a manner which is more fully described in my aforesaid co-pending application, Serial No. 654,279. The diaphragm itself as is clearly illustrated in Figs. 1 and 2, has connected thereto a hollow bolt 27 through which the pressure fluid is introduced into the diaphragm. The hollow bolt 27 has an enlarged flared head 28 welded or otherwise permanently secured to a conical flange 29 on the diaphragm indicated generally at 23. Peripherally arranged passages 30 in the bolt 27 form communicating passages between the hollow chamber 25 and the interior of the diaphragm 23 so that when the pressure fluid is forced into the chamber 25, it is distributed to the diaphragm 23 through the passages 30 and hollow bolts 27.

The present invention relates to diaphragms generally and particularly to a diaphragm such as described to be used for applying the brakes and the method of constructing said diaphragm.

The construction of one form of my invention is illustrated clearly in Figs. 3, 4, and 5 in which the reference characters 31, 32, 33, 34, 35 and 36 indicate flat plates or leaves which are substantially the same outer peripheral dimension. The leaf 31 has the conical flange 29 formed thereon and before assembling the leaves of the diaphragm, the bolt 27 is welded or otherwise secured permanently to the flange 29 so as to provide a leakproof joint therebetween. The leaves 33 and 35 are formed respectively with the upstanding cylindrical flanges 37 and 38. Adjacent leaves 32 and 34 are formed with openings centrally thereof of substantially the same outer diameter as the outer diameters of the flanges 37 and 38 respectively.

Pairs of leaves 31—32, 33—34, 35—36, are then joined peripherally by welding the same along their meeting peripheral edges as at 39, or by turning over the edges of the leaves, whereby the outer peripheries of each pair of leaves are permanently secured together in fluid-tight engagement. The pairs of leaves are then assembled in the manner illustrated in Fig. 4, and the flanges 37 and 38 are then swaged outwardly over the adjacent edges of the leaves 32 and 34 respectively in the manner illustrated in Fig. 5, whereby to make a fluid-tight diaphragm having one port comprising the hollow bolt 27. As will be noted from an inspection of Fig. 5, the passageway between the pairs of leaves 31—32 and 33—34 is larger than the passageway between pairs of leaves 33—34 and 35—36 so that when the leaves are collapsed they may lie flatly against each other and the flanges 37 and 38 will not interfere with the complete collapsing of the diaphragm. This enables the diaphragm to be collapsed within a smaller space and enables the diaphragm to be used to the full extent of its expansibility.

In Figs. 6 and 7, I have illustrated a modified construction of my invention in which there are leaves 40, 41, 42, 43, 44 and 45 similar to the corresponding leaves 31 to 36 inclusive in Fig. 4, but instead of providing flanges such as 37 and 38 on leaves 33 and 35 respectively, on the leaves 42 and 44 respectively, I make the leaves 42 and 44 with central openings of the same diameter as the central openings in the leaves 41 and 43 and join leaves 41 and 42 and leaves 43 and 44 respectively by the eyelets 46 and 47 respectively which are formed as clearly illustrated in Fig. 6 and then upset as in Fig. 7 to overlie the edges of the adjacent leaves and hold the same securely in liquid-tight engagement with each other. The central portions of the leaves are offset in the manner clearly illustrated in Fig. 7 in order to permit the remaining portions of the leaves to be brought into engagement with each other when the diaphragm is completely collapsed.

In Fig. 8, I have illustrated a still further modification of my invention in which there are pairs of leaves 48—49, 50—51, and 52—53, each pair being of successively greater peripheral dimensions, whereby the leaves 49 and 50 can be first joined together centrally as by upsetting the flange 54 on the leaves 40 in a manner similar to that described in connection with the form of the invention shown in Fig. 4 and the flange 55 on the leaf 52 similarly upset over the adjacent edge of the leaf 51 before the peripheral edges of the pairs of leaves are joined by welding at 56 and this enables a very tight joint to be made first between the leaves 49 and 50 and the leaves 51 and 52, and one might even weld these edges together before the outer peripheral edges of the leaves are welded together. The leaves are then assembled as in Fig. 9 and the edges welded at 56. Since the pairs of leaves are successively of greater diameters, one can better weld the edges together with welding equipment.

I prefer to have the leaves of the diaphragm made from resilient metal having long life and capable of assisting the diaphragm in its collapsing movement. In other words by using a spring metal which normally is shaped to a single plane and joining successive leaves together, I can form a diaphragm which when the fluid pressure is released will of its own action tend to collapse the diaphragm away from the brake shoe with the result that the brake shoe is free to release itself from its engagement with the brake drum.

By using a plurality of diaphragms instead of a single diaphragm, it is possible to get a total movement which is greater than can be obtained with the same amount of flexing of the leaves of a single diaphragm. However, I wish to have it understood that my invention is not limited to having a plurality of diaphragms as shown in the drawings, as it may be found desirable to use a single diaphragm for the purposes set forth.

In Figs. 11, 12, and 13, I have illustrated a further form of this invention which is very simple to construct and which will have certain advantages which the forms of the invention previously described do not have. I first take two leaves 57 and 58 and after welding a bolt 59 to the conical flange 60 on the plate 57 in the same manner as I do in connection with the leaf 31 and bolt 27, the leaves are laid one upon the other as illustrated in Fig. 11 and the outer peripheral edges are welded together as at 61 so as to make a hollow chamber which is fluid-tight. The leaf 57 is provided with a transverse rib 62 and the leaf 58 is provided with a transverse rib 63. The left hand end of the diaphragm illustrated in Fig. 11 is then bent downwardly and then inwardly beneath the center section of the diaphragm and similarly the right hand portion of the diaphragm is bent upwardly and over the central portion of the diaphragm so that a cross section through the completed diaphragm looks approximately as illustrated in Fig. 12. Wedge-shaped inserts 64 are inserted between the adjacent portions of the diaphragm so as to maintain the curved edges at the opposite sides of the diaphragm and the welded edges of the diaphragm are turned upwardly and downwardly as at 65 and 66, whereby upon expansion of the diaphragm in the manner illustrated in Fig. 13, the welded joint between the upwardly and downwardly turned edges is not subjected to the flexing strain and therefore the welded joints will not have the tendency to be broken and the metal adjacent the welded joints is not flexed sufficiently to cause a crease in the diaphragm leaves after continued flexing of the leaves. By preventing this creasing, a longer life for the diaphragm is insured for the creasing may result eventually in causing a fracture of the diaphragm leaves adjacent the welded portions thereof. The action of the diaphragm is readily apparent from an inspection of Figs. 12 and 13.

In Figs. 11, 12, and 13, the same reference characters refer to similar parts in Figs. 1 to 10 inclusive. The wedge-shaped inserts 64 are preferably made of heat resisting material which is also substantially rigid and will not give when the fluid pressure is applied to the brakes.

In Figs. 14, 15, 16, 17 and 18, I have shown another embodiment of my invention which may be readily and cheaply constructed, but which produce a wholly satisfactory product.

In constructing this diaphragm a plurality of substantially flat sheets 70 of suitable material preferably spring steel, are superimposed and secured alternately along their side edges at 71 and 72 in any suitable manner, but preferably by welding as shown, for example, in Fig. 14. While in the drawings I have shown three sheets so secured, it is clear that this number may be increased in any desired amount to produce a diaphragm of the desired capacity and size. A second set of flat sheets or plates 73 similarly arranged and secured is then interfitted with a set of sheets 70 in the manner shown in Fig. 14. The two sets of sheets or leaves are then further moved toward each other into superimposed relation, as shown in Fig. 15, and suitably secured as by welding along the side edges 74 and 75. (Fig. 15.) After the side edges of the plates have been secured the end edges of the plates may be suitably secured as by welding the mating end edges 76 of the plates 70 and 73, as shown in Figs. 16 and 17. In Fig. 16 parts of the end welding have been broken away to show better the manner of interfitting of the plates. Fig. 17 shows the completed diaphragm. Referring, for example, to the upper right-hand joint of the plates in Fig. 16, it will be seen that the mating end edges of the plates 70 and 73 will be secured together up to and including the edge 71 of the plates 70, and that thereafter the mating end edges of the plates 73 will be secured together to form a wholly fluid-tight joint 77 (Fig. 17). While I prefer that the side edges 74 and 75 be secured prior to the fastening of the end edges of the plates, it is obvious that the order of these securing operations could be reversed without departing from the spirit of the invention. One of the plates has an orifice formed therein for the introduction of fluid to the diaphragm as in the previously described embodiments. In the drawings there is an orifice 78 in one of the plates 73.

Fig. 18 shows a section through the completed diaphragm with the plates expanded against working surfaces. It will be seen that the multiple chambers 79 of the diaphragm have communication with each other around the ends of the plates. It will also be seen that as the diaphragm is extended the flexing of the plates or leaves is distributed throughout a number of them, thus reducing the strain on any one plate or welded joint and securing durability in the product.

This diaphragm has a number of advantages, as will be readily appreciated. By way of example, it may be readily and cheaply constructed of a number of flat plates. When not expanded, inasmuch as the flexible plates are normally flat, the diaphragm tends to assume a flat, compact condition. Further, inasmuch as the plates are flat, fillers are not as essential as in the embodiment of Figs. 11, 12 and 13, but may be used if desired. There is no tendency, when the diaphragm is expanded, to twist the plates and no undue strain is brought upon any one welded joint.

In Figs. 19, 20, 21, 22, 23, 24 and 25, I have illustrated a further embodiment of my invention. In constructing this embodiment of diaphragm I first take a pair of plates or leaves 83 and 84 of spring steel or other suitable material and bend them together into a generally Z-shaped formation, as shown in Figs. 19 and 20, wherein the various sections of the plates or sheets lie in generally superimposed relation, as shown.

While I prefer to bend two plates together, as this insures that the bends of the plates will correspond, notwithstanding any slight inaccuracies in the bending process, it is to be understood that the diaphragm can be constructed by bending each plate individually to a position as shown in Fig. 19 and then interfitting the two after the manner described in connection with the construction shown in Fig. 14. After two plates have been suitably bent, together or separately, and then interfitted, they are preferably separated slightly so that a space 85 is formed between the bends in the plates, as shown in Fig. 20. The side edges of the plates 83 and 84 may then be suitably secured preferably by welding at 89 and 90, respectively. The plates are then placed between a suitable clamping means and compressed or further bent.

In Fig. 21 one suitable form of clamp is shown, consisting of a pair of jaws 86, which may be drawn together by means of bolts 87. In compressing, the diaphragm plates are placed between the jaws and the bolts drawn up to compress the plates to any suitable degree. As shown, the plates are drawn tightly against suitable filler members 88, preferably of rigid and heat resisting material such as steel, which are inserted between the folds of the plates, as shown in Fig. 21.

The size of the plates is so determined relative to the size of the clamps 86 and the fillers 88 that the end edges 91 of the plates project beyond or overlap the clamps and fillers. The end edges of the plates are therefore accessible while the plates are within the clamp and may be conveniently secured to form a fluid-tight diaphragm, as by welding, while the parts are in this position. When the welding is done with the plates in the clamp the clamp jaws and fillers 88 will help dissipate the heat and thus protect the body of the plates.

While I have described the side edges 89 and 90 of the plates as being secured prior to the time the plates are bent to final position, as shown in Fig. 21, these edges could be secured at the time the end edges 91 are secured, after the plates have been bent to the position shown in Fig. 21. It is convenient to secure the side edges 89 and 90 prior to the time the plates are inserted within the clamp as this tends to facilitate handling of the plates and, due to the spacing 85, the plates are free to slide along each other laterally during bending and therefore no strains will be set up in the plates or the side welds during the bending operations even though the plates are first secured along the edges 89 and 90. It is advantageous, however, that the plates be bent to their final position, as shown in Fig. 21, before the end edges 91 are welded, as this precludes the setting up of any strains in the plates or the welds, as might occur if the plates were secured along their ends as well as their sides and thus relatively fixed and then bent.

In Figs. 22 and 23 one suitable manner of securing the end edges is illustrated. Here the edges 91 are oxyacetylene welded and, at the bends in the plates where the space 85 lies between the edges, filler metal 92, which may be supplied by a welding rod, is introduced into the space at the edge of the plates and welded to the two plates to form with them an integral seal.

In Figs. 24 and 25 one alternate method of securing the end edges of the plates to form the diaphragm is illustrated. In this case the edges 91 of the plates 83 and 84 are oxyacetylene welded, as before, but in place of using filler metal in the bend, the plate 84 on the inside is forced outwardly at the bend at 93, as by swedging, and sealed by welding against the bent portion of the plate 83, thus closing the space 85 and forming a fluid-tight diaphragm. One of the plates has a suitable orifice 94 for the introduction of fluid to the diaphragm as in the other embodiments of my invention.

While I have shown two interfitted metal plates formed of but three folds, which makes a very desirable diaphragm, it is obvious that the number of similarly arranged plates or the number of folds could be increased at will or decreased to two, to produce a diaphragm of any desired capacity and size. Thus three or more plates could be interfitted, and a larger number of folds could be made. Further, while I prefer to weld the side edges 89 and 90 of the plates prior to the welding of the ends 91, it is clear that the order of these welding operations could be reversed without departing from the spirit of the invention, all the edges of the plates being welded after the plates are bent to final position. Further, it is to be understood in connection with this and other embodiments of the invention that any means of securing the plates may be utilized. I prefer welding, as this has proved to be most satisfactory. Any known type of welding may be used, but I prefer oxyacetylene welding which has the advantage that it does not decrease the effective areas of the plates as does such welding as simple heat welding.

A diaphragm constructed as above described has a number of advantages, as will be readily appreciated. By bending the plates prior to the time they are welded at their ends no strains can be set up in the metal or in the welds themselves by the bending operation, as the securing of the plates in fixed relative position does not occur until after they have been bent and assumed the position which they will occupy in the complete and finished product. The diaphragm may be readily and conveniently constructed from a pair of ordinary metallic sheets of suitable metal, as steel, by a simple bending process and by thereafter welding the exposed ends to produce a fluid-tight diaphragm.

The operation of this form of diaphragm is substantially like that of the diaphragm of Figs. 11, 12 and 13, and similar filler members would preferably be used, the diaphragm having a plurality of communicating expansible chambers making up a composite diaphragm having a large capacity for expansion as in the other embodiments of the invention.

The fluid may be introduced into the diaphragm in the manner indicated in my aforementioned application, Serial No. 654,279 or in any other desired manner. Also it is to be understood that the diaphragm construction is of general application and is suitable for a great number of other purposes than that described in this application. That form of the diaphragm specifically shown in Figs. 3 to 10 inclusive of the drawings is not claimed herein, but is claimed in copending applications, including my aforementioned copending application Serial No. 683,585. The general brake construction is claimed in my copending application Serial No. 654,279.

Obviously, those skilled in the art to which this invention pertains may make various changes in the particular construction and arrangement of parts without departing from the spirit of this invention, and therefore I do not wish to be limited except as hereinafter set forth in the appended claims.

Having thus fully described my invention, what I claim as new and desire to obtain by Letters Patent is:

1. The method of forming diaphragms which comprises the steps of forming a metallic leaf with a transverse rib superimposing a second leaf on said first leaf and uniting said leaves peripherally to form a fluid chamber, bending both of said leaves simultaneously upon themselves along a line which was substantially the axis of said rib on the outside of the fold produced by bending the leaves upon themselves whereby a fluid passage around the fold is provided to form a communication between the different portions of the chamber formed by said leaves.

2. The method of making diaphragms which comprises the steps of superimposing a plurality of metal leaves one of which has an outlet opening therein permanently uniting the peripheral edges of said leaves to form between said leaves a fluid-tight chamber, and thereafter doubling said leaves upon themselves to bring different portions of said chamber in superimposed relation with each other.

3. The method of forming metallic diaphragms which comprises the steps of uniting a pair of metallic leaves peripherally to form a fluid chamber, and thereafter folding opposite end portions of said chamber backwardly over the upper and lower sides of the central portion of said chamber to bring the end portions of said chambers in superimposed relation with the central portion of said chamber.

4. The method of forming an expansible diaphragm which comprises bending a set of superposed plates upon themselves to bring different surfaces of the plates in superimposed relation, and thereafter securing the peripheral portions of the plates to form a plurality of fluid-tight communicating chambers.

5. The method of forming an expansible diaphragm which includes superimposing a plurality of plates to form a set, securing a plate along one edge to an adjacent plate above and along another edge to an adjacent plate below, interfitting with said set of plates a second set of similarly arranged plates, and securing the peripheral edges of the sets of plates to form a plurality of fluid-tight communicating chambers.

6. The method of forming a plurality of communicating expansible fluid-tight chambers, which includes interfitting a pair of members having substantially a Z-shaped cross section, and thereafter securing the edges of the members in fluid-tight joints.

7. A diaphragm comprising a pair of interfitting Z-shaped members, secured together at their peripheries in a fluid-tight joint to form a plurality of superimposed expansible communicating chambers.

8. A diaphragm comprising a pair of interfitting Z-shaped members, secured together at their peripheries in a fluid-tight joint to form a plurality of superimposed substantially parallel expansible communicating chambers, and filler members inserted between adjacent chambers.

9. A metal diaphragm comprising a pair of interfitted Z-shaped substantially flat plates, the edges of said plates being united to form a Z-shaped fluid-receiving chamber, and the opposite ends of said united edges extending at a substantial angle to the adjacent chamber-forming portions of said united plates whereby to protect the end edges during flexure of the diaphragm.

10. A metallic diaphragm construction comprising a superposed pair of metallic plates having substantially reverse folds therein, said plates being of substantially the same size and shape and being sealed together at their edges whereby to form a plurality of superposed connected diaphragm chambers, the opposed plates forming the individual chambers being adapted to lie flat one against the other when said diaphragm is collapsed, and means for inflating and collapsing said diaphragm.

11. A metallic diaphragm comprising a pair of normally flat metallic plates united peripherally and doubled upon themselves to form a fluid chamber having a plurality of portions thereof in superposed relation, and means for inflating and collapsing said chamber, the plate portions forming opposed walls of the fluid chamber being adapted to lie in flat contact with each other upon collapse of the diaphragm chamber, the plate portions at the bends therein being adapted to remain separated upon collapse of the diaphragm whereby to maintain a fluid passageway therebetween.

12. A diaphragm comprising a plurality of superposed substantially flat polygonal plates secured together peripherally and having portions thereof bent over upon themselves whereby to form a plurality of superposed expansible diaphragm chambers, the plate portion forming the outer plate surface of one of the end diaphragm chambers having an opening formed therein for the emission and ingress of operating fluid to and from said diaphragm chamber.

13. A diaphragm comprising a plurality of superposed substantially flat polygonal plates secured together peripherally and having portions thereof bent over upon themselves whereby to form a plurality of superposed expansible diaphragm chambers, the plate portion forming the outer plate surface of one of the end diaphragm chambers having an opening formed therein for the emission and ingress of operating fluid to and from said diaphragm chamber, the opposed plate surfaces forming the diaphragm chambers being adapted to collapse into contacting relation substantially over their entire surfaces when the diaphragm is in contracted condition.

14. A diaphragm comprising a plurality of superposed substantially flat polygonal plates secured together peripherally and having portions thereof bent over upon themselves whereby to form a plurality of superposed expansible diaphragm chambers, the plate portion forming the outer plate surface of one of the end diaphragm chambers having an opening formed therein for the emission and ingress of operating fluid to and from said diaphragm chamber, the opposed plate surfaces forming the diaphragm chambers being adapted to collapse into contacting relation substantially over their entire surfaces when the diaphragm is in contracted condition, and filler members substantially co-extensive with the chambers arranged between the plate surfaces of adjacent chambers.

15. A diaphragm as defined in claim 14 wherein the filler members are wedge-shaped in cross section.

16. The method of forming an expansible diaphragm which comprises bending a set of superposed plates upon themselves to bring different surfaces of the plates in superposed relation, and securing the peripheral portions of the plates whereby to form a plurality of fluid-tight superposed communicating chambers, said peripheral securing and bending operations being performed in any suitable order.

17. The method of forming an expansible diaphragm which comprises bending a set of superposed plates upon themselves to bring different surfaces of the plates in superposed relation, moving said plates relatively laterally whereby to separate them slightly at the bends, and securing the peripheral portions of the plates whereby to form a plurality of fluid-tight superposed communicating chambers.

WILLIAM CLIFFORD SHAW.